United States Patent [19]

Bradley et al.

[11] 4,061,344

[45] Dec. 6, 1977

[54] FITTING FOR PENETRATION THROUGH FIRE RATED BARRIERS

[75] Inventors: Robert L. Bradley, Burlington; Daniel J. Sullivan, New Britain, both of Conn.

[73] Assignee: General Signal Corporation, Rochester, N.Y.

[21] Appl. No.: 699,029

[22] Filed: June 23, 1976

[51] Int. Cl.² .............................................. H02G 3/22
[52] U.S. Cl. .......................................... 277/26; 52/232; 174/151; 248/56; 285/187; 285/196
[58] Field of Search ............... 248/56, 68 CB; 138/89; 174/151; 52/232; 285/192, 196, 338, 187; 277/26; 403/227, 228

[56] References Cited
U.S. PATENT DOCUMENTS

| 1,541,756 | 6/1925 | Williams | 138/89 |
|---|---|---|---|
| 1,851,939 | 3/1932 | Williams | 138/89 |
| 1,851,940 | 3/1932 | Williams | 138/89 |
| 2,155,491 | 4/1939 | Jacobs | 138/89 |
| 2,733,939 | 2/1956 | Scherer | 285/192 X |
| 3,272,521 | 9/1966 | McNenny | 277/26 X |
| 3,441,662 | 4/1969 | Augenstein et al. | 174/151 |
| 3,466,222 | 9/1969 | Curtis | 52/232 X |
| 3,540,740 | 11/1970 | Smith | 277/26 |
| 3,606,348 | 9/1971 | Taylor | 277/26 |
| 3,655,907 | 4/1972 | Philibert et al. | 138/89 X |
| 3,779,585 | 12/1973 | Handzlik | 248/56 X |
| 3,864,883 | 2/1975 | McMarlin | 52/232 X |
| 3,869,132 | 3/1975 | Taylor et al. | 277/26 |
| 3,976,825 | 8/1976 | Anderberg | 248/56 X |
| 3,995,102 | 11/1976 | Kohaut | 52/232 X |

FOREIGN PATENT DOCUMENTS

| 2,162,251 | 6/1973 | Germany | 52/232 |
|---|---|---|---|
| 2,154,841 | 5/1973 | Germany | 52/232 |
| 1,203,461 | 8/1970 | United Kingdom | 52/232 |

*Primary Examiner*—Roy D. Frazier
*Assistant Examiner*—Rodney H. Bonck
*Attorney, Agent, or Firm*—Milton E. Kleinman; George W. Killian

[57] ABSTRACT

Penetrations or passageways through fire rated or fire resistant walls, floors, partitions, and ceilings are frequently necessary to provide for present or future pipes, cables or conduits. A fitting placed in the penetration provides a seal to prevent the passing of fire, products of combustion, gas vapor or liquid through the penetration under normal conditions and under adverse conditions of fire or elevated temperatures. The fitting includes an elastomeric-like material, under pressure, which provides the initial barrier. An intumescent material, which responds to heat is provided to expand and fill any void created by the degeneration of the elastomeric material in response to the heat or fire. The fitting may include an outer exposed layer of intumescent material to serve as an insulator.

14 Claims, 4 Drawing Figures

FITTING FOR PENETRATION THROUGH FIRE RATED BARRIERS

BACKGROUND OF THE INVENTION

This invention relates to a structure for maintaining the integrity of a fire, vapor and smoke barrier which must have penetrations for present or future electrical cables, pipes, conduits or other purposes. Various types of fittings have been developed for providing smoke and vapor barriers. A typical fitting of this nature is disclosed in U.S. Pat. No. 3,655,907 issued to Robert A. Philibert et al on Apr. 11, 1972, and which is owned by the same corporation to which the present invention is assigned. The Philibert et al patent employs a sealing material, such as an elastomeric material which, under the force of pressure, deforms or distorts to seal an opening against the passage of smoke, gas or vapor. However, when such a fitting is exposed to intense heat, or direct flame, for a sufficient length of time, the sealing material is destroyed and smoke or vapor may pass through the barrier. With the integrity of the barrier broken, a fire or dangerous gas on one side may be transmitted to the other side.

There are numerous situations wherein safety considerations require maintaining the integrity of a barrier. For example, a high integrity barrier is required in locations such as; nuclear power plants, on ships, submarines, aircraft, space vehicles and many other more routine applications such as, walls, floors, ceilings, etc. to secure safety of personnel and/or equipment.

It has been suggested that the sealing material of the Philibert et al patent might degenerate in the presence of intense heat or flame. Even if this did not occur, the insulation on the wire passing through the sealing material might degenerate, shrink or burn in the presence of intense heat or flame. If this should occur, the integrity of the barrier would be destroyed just as effectively as if the sealing material had itself been destroyed.

Prior art devices have attempted to use an intumescent material to overcome the last named difficulty. An intumescent material is one which expands under certain conditions. The type of intumescent material which would find usefulness for the problem under consideration is one which will expand in the presence of heat or flame. U.S. Pat. No. 3,864,883 discloses the use of an intumescent material to provide some protection under certain circumstances.

SUMMARY OF THE INVENTION

In accordance with the teachings of the present invention, a structure is provided for supporting a pipe, cable or conductor as it passes through a penetration in a fire, smoke and vapor barrier and which is so designed that when properly installed, provides a fire, smoke and vapor barrier under normal and extended adverse conditions. A modified structure may also be used to seal an unused penetration in the barrier. A sealing material is used to provide the smoke and vapor barrier under normal operation conditions. A heat responsive film of intumescent material is applied to at least most exposed surfaces of the fitting to provide some insulation in the event of the occurrence of intense heat or open flame. In addition, the fitting includes intumescent material which, in the presence of intense heat, will expand to fill any passageway which might otherwise open through the penetration as a result of damage or destruction of the sealing compound and/or cable insulation, conduit or pipe.

Depending upon the probability of fire on each side of the fire, smoke and vapor barrier, the fitting may be made to offer equal protection in either direction or superior protection in one direction. In addition, depending upon the thickness of the fire, smoke and vapor barrier, separate fittings could be provided on each side of the barrier.

In one embodiment, plural layers of sealing material may be used, while in another embodiment of the invention, the intumescent material and the sealing material might be combined into a single compound.

The fittings of the present structure may be designed to permit their assembly around existing cables or pipes in a penetration through a barrier or the fittings may be designed for placement in the penetration and pulling the cable or pipe therethrough.

Fittings may also be provided to secure a penetration in a barrier which has no pipes or cables passing therethrough. Fittings may be provided for single cables or pipes or a plurality of cables or combinations of cables and pipes.

It is an object of the invention to provide a new and improved fitting for use in a fire, smoke and vapor barrier.

It is a more specific objection of the invention to provide a fitting for use in a penetration through a fire, smoke and vapor barrier which will maintain the integrity of the barrier under normal conditions and under adverse conditions of intense heat and open flame.

It is another object of the invention to maintain a seal or a closure of the penetration even though the insulation on any cable passing through the fitting is destroyed and degenerated by exposure to heat or flame.

It is another object of the invention to provide a fitting for use in a fire, smoke and vapor barrier which is equally effective in protecting the integrity of the barrier irrespective of the side which may be exposed to the detrimental effects of intense heat or open flame.

The elements of the various figures are identified with three digits, wherein the first digit represents the figure number. In all cases where the last two digits are the same, the elements are similar, or serve similar functions.

DESCRIPTION OF THE PREFERRED EMBODIMENT

Figure 1:
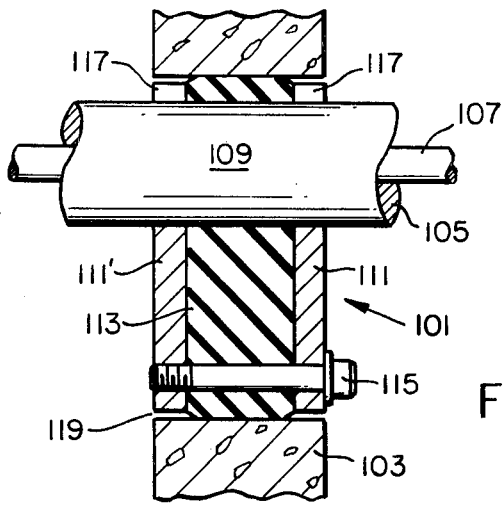
FIG. 1 discloses a typical prior art fitting for use in a penetration through a barrier.

Considering now more specifically FIG. 1, there will be seen a typical prior art structure as disclosed in U.S. Pat. No. 3,655,907. The fitting 101 passes through a barrier 103 which may comprise a metal sleeve, or a concrete wall, as illustrated, or any other suitable material. The fitting 101 provides for the passage of one or more cables 105 having a conductor 107 covered by insulation 109. The fitting 101 includes plates 111 and 111' with a compressible material 113 such as an elastomeric material which provides the seal to prevent the passage of smoke or vapor from the plate side 111 to the plate side 111' or vice versa. The sealing material 113 is compressed by drawing the plates 111 and 111' towards each other by tightening the screw 115 which is threaded into a threaded hole in plate 111'. If desired, a separate nut and washer combination could be used in place of the threaded hole in plate 111'. More specific details concerning this structure may be seen in the cited patent. As set forth in the cited patent, the plates 111 and/or 111' may include slots 117 to reduce the possibility of the circulation of eddy currents in the plates 111 and 111'. Additionally, as set forth in the cited patent, the plates 111 and 111' may be coated with an insulating material to protect the plates 111 and 111' from the detrimental effects of humidity and/or to facilitate the pulling of the cable 105 through the hole in the plates 111 and 111' without the edges of the plates damaging the insulation 109.

U.S. Pat. No. 1,851,940 issued Mar. 29, 1932, to O. H. Williams discloses a fitting wherein the plates equivalent to the plates 111 and 111' are totally segmented to facilitate assembly of a fitting around an existing cable through a penetration in a barrier. In a similar manner, the sealing material 113 could be segmented if expedient to do so to facilitate some types of assembly.

It will be apparent that if conditions made it desirable to do so, the plate 111 could have a larger diameter than the penetration 119 in the barrier 103 so that the modified plate 111 would not go into the penetration 119, but would span it. In addition, by suitable and obvious modifications, the plate 111' could be enlarged in the same manner as set forth with respect to plate 111. Normally, only one of the plates 111 or 111' would be modified as described, as otherwise it might be impossible to draw the plates 111 and 111' towards each other by tightening the screw 115 to thereby compress the seal 113.

It will also be evident that if the barrier 103 is considerably thicker in the direction of the penetration, a fitting 101 could be used on each side of the barrier 103.

As will be seen by examining the cited Philibert U.S. Pat. No. 3,655,907, FIG. 1 is a cross section view of a fitting 101 which may have three cables similar to 105 and three screws similar to 115. It will be evident that a different number of cables and/or screws could be used to satisfy specific requirements.

Figure 2:
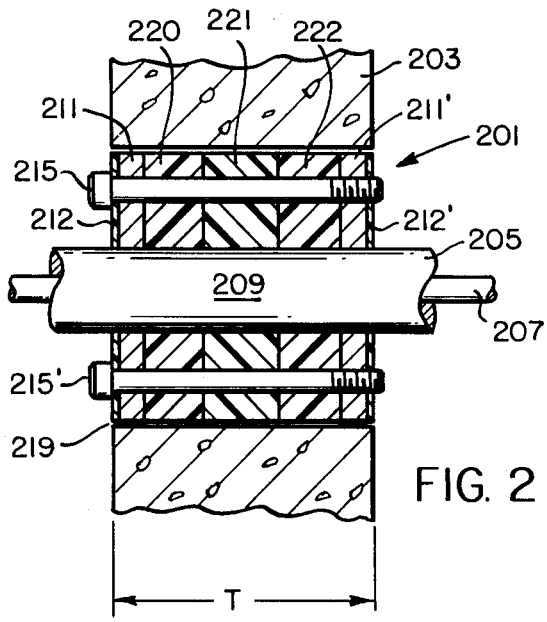
FIG. 2 discloses a structure in accordance with the invention and shows in partial cross section a fitting for providing an improved seal in a barrier.

Considering now more specifically FIG. 2, there will be seen a fitting 201 which extends through a penetration 219 in a barrier 203 which, in this illustration, consitutes a concrete wall. In this particular illustration, a single cable 205 with a conductor 207, covered by insulation 209, is disclosed. However, it will be evident that with conventional modifications, the fitting 201 could be adapted to pass more conductors. The fitting 201 includes plates 211 and 211' which are fastened together by screws 215 and 215' which screw into threaded holes in plate 211'. Turning and tightening the screws 215 and 215' will tend to draw the plates 211 and 211' towards each other. In this particular illustration, the screws 215 and 215' are only finger tight, as the sealing material which may comprise one or more of the elements 220, 221 or 222 is not distorted by compressive forces to seal the penetration 219. When the screws 215 and 215' are tightened, the pressure will distort one or more of the sealing elements, as illustrated in FIG. 1, for the sealing element 113.

An intumescent material is one which is capable of swelling or expanding under certain conditions. Hydrated sodium silicate is an intumescent material which expands in the presence of heat and exhibits other advantageous properties to be explained more fully hereinafter. A suitable hydrated sodium silicate is made by BASF-WYNDOTTE in Germany and sold in the United States under the trade name PALUSOL. This intumescent material is a hard substance having an appearance and physical characteristic somewhat similar to fiber glass. It may be molded, machined and worked, but is dimensionally quite stable, except in the presence of heat which causes it to expand considerably if not otherwise restricted. Hydrated sodium silicate is a poor thermal conductor and hence a good temperature insulator; it intumesces at a temperature of the order of 150° celsius. Other materials and compounds can be designed to intumesce at other temperatures.

The plates 211 and 211' may be made ferromagnetic or or nonferromagnetic metallic alloys or other suitable high strength, high melting point material. If ferromagnetic plates are used, slots may be used to prevent induction heating of individual single conductors all as described in the cited patent of Philibert. A layer 212 and 212' of intumescent material is bonded to the exposed side of each plate 211 and 211'. The layer of intumescent material bonded to the plates 211 and 211' serve the same function as the polyvinyl chloride coating applied to the plates 111 and 11' of the prior art. In addition, the layer of intumescent material 212 and 212' serves as an insulator to keep the plates 211 and 211' from conducting heat from outside the fitting 201 to the interior parts. Furthermore, in the presence of intense heat, exterior to the fitting 201, the intumescent layer 212 and/or 212' will expand, thereby providing an even better heat insulator and filling any possible voids through which heat might penetrate to the interior of the fitting 201. This includes the possibility of the intumescent material 212 or 212' expanding towards the conductor 207 in the event that the insulation 209 should burn or shrink due to intense heat.

Within the interior of the fitting 201 are three layers of material designated 220, 221 and 222. Normally, the layers 220 and 222 will be of similar material and the layer 221 of different material. In one embodiment, the layers 220 and 222 may comprise intumescent material while the layer 221 comprises sealing material which may be an elastomeric substance such as that sold under the trade name NEOPRENE. In another embodiment of the invention, the layers 220 and 222 may comprise the sealing material while the layer 221 will be an intumescent material. The particular embodiment used, and the relative thicknesses of the various layers, will depend upon a variety of factors; including, but not limited to, the thickness T of the barrier 203, the probability of undesired temperature elevation on one side or the other of the barrier 203 and/or the probability of an increased temperature elevation on one side as compared with the probability of an increased temperature elevation on the other side; and the anticipated magnitude of possible temperature rise, together with the time duration thereof. Also, instead of using only three layers 220-222, a larger plurality of alternating layers of sealing material and intumescent material may be used.

The sealing ring may be made from a flame retardant neoprene or other suitable material. Sealing rings may also be made from chloral sulfanated polyethylene (CSPE) sold by DuPont under the trade name HYPALON and which provides increased radiation resistance.

It should be understood that the function of the fitting 201 is to preserve the integrity of the barrier 203 so that almost no matter what conditions may inadvertently occur, the fitting 203 will preserve barrier integrity and prevent the transmission of flame, smoke, gases, moisture or radiation from passing through the penetration 219. It is recognized that under adverse conditions, the wire, cable or conduit passing through the fitting 201 may be completely destroyed and that both it and the fitting 201 will have to be replaced in order to restore service. In the presence of an abnormal condition resulting in elevated temperatures, the intumescent layer of material 212 or 212' will expand and provide increased thermal protection to minimize conductance of heat through the plates 211 and 211' to the layer 220 or 222, respectively. If the heat, which for the purposes of this discussion will now be presumed to have originated on the side with plate 211, should be sufficiently intense and/or last sufficiently long, it may penetrate through the plate 211 and begin to heat the layer 220. If the layer 220 is made of intumescent material, it will attempt to expand and fill any openings between the plate 211 and the barrier 203 to prevent the passage of heat, smoke, fumes, etc. from side 211 to side 211'. Furthermore, if the insulation 209 on the cable 205 has been consumed by fire, and/or shrunk due to the affects of heat, the intumescent material 220 will expand to fill the void and maintain the integrity of the barrier. If the fitting 201 is of the type where the layer 220 comprises a sealing material, such as neoprene, it will provide a barrier to the passage of smoke, gas and/or vapor through fitting 201. However, the sealing material 220 may be damaged by intense heat or open flame and lose its sealing capability. In this event, the heat that will penetrate through to the layer 221, which comprises an intumescent material, will expand and fill the volume lost by the degenerating sealing element 220.

It will be apparent that a greater number of layers 220, 221 and 222 could be used, if desired, and that the outer most layers could both be of sealing material; or both of intumescent material; or one of sealing material and the other of intumescent material, all depending upon the exigencies of the particular application wherein the fitting might be used.

Fittings designed in accordance with the principles disclosed herein have been tested and have been found to meet the requirements of the standard fire endurance test; ASTM E-119.

It will be apparent to those skilled in the appropriate arts that should conditions warrant, a fitting similar to 201 could be used on each side of a barrier 203 if the barrier 203 were sufficiently thick.

Figure 3:
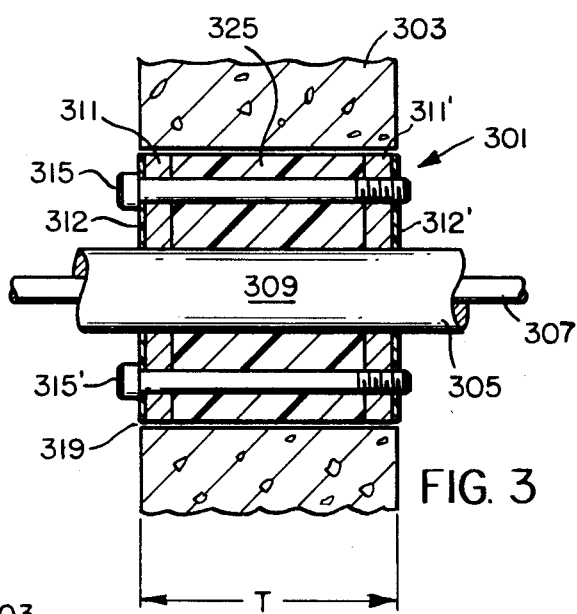
FIG. 3 shows a modified structure which may be used.

Considering now more specifically FIG. 3, there is shown therein another modification of the basic structure. In FIG. 3, elements which have the same last two digits as the elements of either FIG. 1 or 2 are very similar in both form and function and correspond to the elements of those figures and will not be more fully described herein, except where necessary to describe the characteristics which distinguish the structure of FIG. 3.

The fitting 301 differs from the fitting 201 principally in that instead of using alternate layers 220, 221 and 222 etc. the fitting 301 includes a heterogeneous member 325 comprising both the sealing member and the intumescent material and which is compressible so that after the fitting 301 is assembled in a penetration 319 in a barrier 303, the screws 315 and 315' may be tightened to draw the plates 311 and 311' towards each other and compress the heterogeneous member 325 so that it will bulge outward and provide an effective seal to prevent the passage of flame, smoke, gas and vapors from one side of the barrier 303 to the other side. The compound 325 could be manufactured by embedding particles of an intumescent material in a neoprene, or other suitable substance. Other heterogeneous compressible compounds could be developed.

The sealing rings, intumescent material and end plates could all be segmented, as taught in one of the cited references, to facilitate assembly around in-place conductors.

Figure 4:
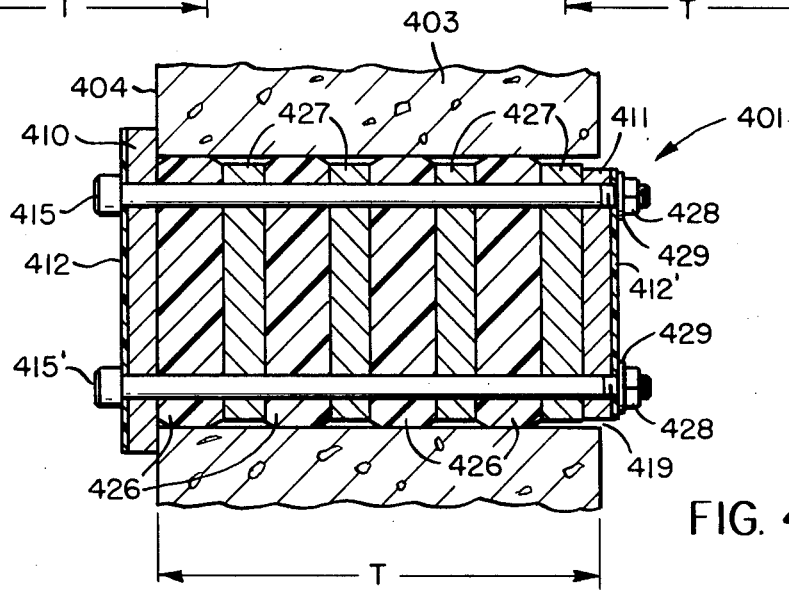
FIG. 4 illustrates another modification of the structure used to seal an unused penetration in a barrier.

Considering now more specifically FIG. 4, there is shown therein another modification of the basic structure. In FIG. 4, elements which have the same last two digits as the elements of preceding figures are elements which are very similar in both form and function and correspond to elements of the preceding figures and will not be more fully described herein, except to the extent necessary to make evident the characteristics which distinguish the structure of FIG. 4.

FIG. 4 distinguishes from the other figures in three principal characteristics. As suggested, with respect to FIG. 2, multiple layers of sealing material and intumescent material may be used. In FIG. 4, the layers 426 and 427 are sealing material and intumescent material, respectively. Either sealing material 426 of intumescent material 427 may be closer to the plates 410 or 411.

The plate 410 differs from the plates 311, 211 and 111 in that the plate 410 is larger than the width of the opening 419. Thus, the plate 410 abuts the face 404 of the barrier 403 instead of being inside the penetration 419. The choice of the larger plate 410 or the smaller plate similar to 311 may be based on a variety of factors including: an aesthetic appearance; the size of the penetration 419; the material of the barrier 403; the thickness T of the barrier 403 and other factors familiar to those skilled in the applicable arts. The plate 410 includes a coating 412 of intumescent material on the outer surface. In addition, a coating (not shown) could be used on the side of the plate 410 which contacts the surface 404 of the barrier 403.

FIG. 4 also differs from the other figures in that washers 428 and nuts 429 are used instead of threading the plate 411.

The fitting 401 is illustrated with the screws 415 and 415' tightened to compress the sealing material 426. Accordingly, the sealing material 426 will be seen to be bulged and making a sealing contact with the barrier 403.

Another way in which the fitting 401 differs from the other fittings, is that the fitting 401 is used to plug a penetration 419 in a barrier 403 that is not used for any other purpose. That is, no cables, wires or conduits pass through the penetration 419.

Although it does not form an integral part of this structure, it will be evident to those skilled in the art that if the element 305, 205 or 105 should comprise a pipe or conduit which is a heat conductor, it might be necessary to provide a segment with thermal insulation to prevent transmission of excessive heat from one side of the barrier to the other.

In addition to providing the sealing capabilities described, the fittings are also capable of providing cable or conduit support. That is, the compression of the elastomeric seals causes it to contact the barrier and also to apply a force against the cable or conduit passing through the fitting. Accordingly, in a completely assembled fitting, the cable, conduit or pipe could not be moved relative to the fitting without exerting considerable force. Therefore, the described fitting can be used to support vertical cables, conduits or pipes and provide the required support. During conditions of high heat or fire, the intumescent material will expand and continue to provide the necessary support function, even though the elastomeric material or the insulation on the cable may have deteriorated from the heat.

While it is customary to make penetrations through barriers which are round, it should be understood that the fittings disclosed herein may be made with any appropriate shape to fit penetrations of other shapes. For example, the fittings may be made from rectangular or oval penetrations as may be required for particular applications.

While there has been shown and described what is considered at the present to be the preferred embodiment of the invention, modifications thereto will readily occur to those skilled in the related arts. For example, in another structure, materials which intumesce in the presence of some characteristic other than heat might be used, or the intumescent and elastomeric materials could be placed in the penetration longitudinally. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A fitting for placement in a penetration in a fire rated barrier to maintain the integrity of the barrier before, during and subsequent to a fire and comprising in combination:
   a. first and second sealing materials disposed in said penetration which are compressible and intumescent, respectively, and which are in contiguous relationship; and with said first sealing material subject to dehydration, deterioration and volume reduction in response to a temperature above a threshold temperature and said second sealing material subject to the start of intumescence at, or below, said threshold temperature; and
   b. pressure control means applying pressure to said first and second sealing materials for causing said first sealing material to seal said penetration against the passage of gases through said penetration from one side of said barrier to the other and for confining the initial volume into which said second sealing material expands when it intumesces; whereby any reduced volume of said first sealing material resulting from deterioration thereof in response to reaching said threshold temperature is filled by the intumescence of said second sealing material for maintaining the seal of said penetration against the passage of gases through said penetration from one side of said barrier to the other.

2. The combination as set forth in claim 1, wherein said pressure control means comprises first and second plates each having a configuration approximating that of said penetration in said barrier and between which said first and second sealing materials are initially confined.

3. The combination as set forth in claim 2, wherein said first and second plates are coupled by support means for controlling the separation therebetween and concomitantly the pressure on said first and second sealing materials.

4. The combination as set forth in claim 3, wherein said penetration is traversed by a longitudinal element and said first and second sealing materials surround the part of said longitudinal element between said first and second plates and with said first sealing material in contact with said longitudinal element before said threshold temperature is reached.

5. The combination as set forth in claim 4, wherein said compressible sealing material bears on said longitudinal element for inhibiting relative motion therebetween.

6. The combination as set forth in claim 5, wherein said intumescent sealing material bears on said longitudinal element for inhibiting relative motion therebetween when said intumescent sealing element intumesces.

7. A fitting for placement in a penetration in a fire rated barrier to maintain the integrity of the barrier before, during and after a fire and comprising in combination:
   a. a compressible sealing material disposed in said penetration and which is subject to dehydration, deterioration and volume reduction in response to a temperature rise above a threshold magnitude;
   b. pressure control means confining and deforming said compressible sealing material for causing it to respond to pressure and contact the limits of said penetration and maintain the integrity of said barrier to prevent the passage of gases from one side of the barrier to the other; and
   c. a second sealing material disposed in said penetration in contiguous relationship with said compressible sealing material and subjected to the same confinement and pressure as said compressible sealing material and which starts to intumesce in the presence of a temperature no greater than said threshold magnitude for maintaining said passageway sealed against the passage of gases from one side of the barrier to the other as said compressible sealing material deteriorates in response to said temperature rising to said threshold magnitude.

8. The combination as set forth in claim 7, wherein said pressure control means includes means for selectively varying the pressure applied to said compressible sealing material.

9. The combination as set forth in claim 8, wherein said pressure control means includes pressure plates having exposed surfaces thereof covered with a film of heat responsive intumescent material for providing a thermal barrier.

10. The combination as set forth in claim 7, wherein said compressible sealing material and said second sealing material comprise a heterogeneous composition.

11. The combination as set forth in claim 7, wherein said second sealing material expands into any void between said pressure control means including that which results from degeneration of said compressible sealing material.

12. The combination as set forth in claim 7, wherein said fitting surrounds a longitudinal element extending through said penetration from one side of the barrier to the other.

13. The combination as set forth in claim 12, wherein said compressible sealing material bears on said longitudinal element extending through said penetration for inhibiting relative motion therebetween.

14. The combination as set forth in claim 13, wherein said second sealing material bears on said longitudinal element extending through said penetration for inhibiting relative motion therebetween when said second sealing material intumesces.

* * * * *